United States Patent [19]

Haeberle

[11] Patent Number: 5,135,963

[45] Date of Patent: Aug. 4, 1992

[54] AQUEOUS DISPERSIONS OF POLYURETHANES WHICH ARE CROSSLINKABLE BY THE ACTION OF HIGH ENERGY RADIATION

[75] Inventor: Karl Haeberle, Neustadt; Peter Weyland, Frankental; Guenter Eckert, Limburgerhof; Hans Renz, Meckenheim; all of Fed. Rep. of Germany

[73] Assignee: BASF Aktiengesellschaft, Ludwigshafen, Fed. Rep. of Germany

[21] Appl. No.: 507,465

[22] Filed: Apr. 11, 1990

[30] Foreign Application Priority Data

Apr. 11, 1989 [DE] Fed. Rep. of Germany ....... 3911827

[51] Int. Cl.$^5$ .............................................. C08G 18/67
[52] U.S. Cl. ........................................ 522/84; 522/86; 522/90; 522/98; 524/591; 528/75
[58] Field of Search ..................... 524/591; 522/84, 86, 522/90, 98; 528/75

[56] References Cited

U.S. PATENT DOCUMENTS

| | | | |
|---|---|---|---|
| 4,153,778 | 5/1979 | Park et al. | 528/76 |
| 4,314,922 | 2/1982 | Lehner et al. | 525/454 |
| 4,339,566 | 7/1982 | Rosenkranz | 528/68 |
| 4,722,966 | 2/1988 | Flakus | 524/840 |

FOREIGN PATENT DOCUMENTS

| | | |
|---|---|---|
| 0033898 | 8/1981 | European Pat. Off. |
| 0098752 | 1/1984 | European Pat. Off. |
| 0146897 | 7/1985 | European Pat. Off. |
| 0209684 | 1/1987 | European Pat. Off. |
| 3437918 | 4/1986 | Fed. Rep. of Germany |

Primary Examiner—Maurice J. Welsh
Assistant Examiner—Rachel Johnson
Attorney, Agent, or Firm—Oblon, Spivak, McClelland, Maier & Neustadt

[57] ABSTRACT

Aqueous dispersions of polyurethanes which are crosslinkable by the action of high energy radiation contain (a) a polyisocyanate, (b) a polyol having a molecular weight of from 400 to 6,000 g/mol, (c) if required, a polyol having a molecular weight of from 62 to 399 g/mol, (d) if required, a polyamine having two or more amino groups which are reactive to isocyanate, (e) if required, an aminoalcohol having one or more amino groups which are reactive to isocyanate, (f) a compound containing ionic groups or groups which can be converted into ionic groups and one or more hydroxyl or amino groups which are reactive to isocyanate (g) if required, a monofunctional polyetheral and (h) a compound having one or more ethylenically unsaturated groups and one or more hydroxyl groups. The compound having an ethylenically unsaturated group (h) is used in amounts corresponding to 0.02-0.08 gram equivalent, based on the polyisocyanate (a), of OH, and the polyurethane, dissolved in dimethylformamide, has a Fikentscher K value greater than 40 or is insoluble in dimethylformamide.

3 Claims, No Drawings

AQUEOUS DISPERSIONS OF POLYURETHANES WHICH ARE CROSSLINKABLE BY THE ACTION OF HIGH ENERGY RADIATION

The present invention relates to aqueous dispersions of polyurethanes which are crosslinkable by the action of high energy radiation and contain
a) 1 gram equivalent of NCO of a polyisocyanate,
b) 0.1–0.8 gram equivalent of OH of a polyol having a molecular weight of from 400 to 6,000 g/mol,
c) 0–0.8 gram equivalent of OH of a polyol having a molecular weight of from 62 to 399 g/mol,
d) 0–0.4 gram equivalent of NH of a polyamine having two or more amino groups which are reactive to isocyanate,
e) 0–0.4 gram equivalent of OH of an amino alcohol having one or more amino groups which are reactive to isocyanate,
f) 0.05–0.5 gram equivalent of OH or NH of a compound having ionic groups or groups which can be converted into ionic groups and having one or more hydroxyl or amino groups which are reactive to isocyanate,
g) 0–0.2 gram equivalent of OH of a monofunctional polyetherol and
h) a compound having one or more ethylenically unsaturated groups and one or more hydroxyl groups,
with the provisos that (i) the sum of the number of OH and NH gram equivalents is from 0.9 to 1.2 and (ii) the components under a) to h) may be present in the form of individual compounds or mixtures of two or more individual compounds.

Aqueous dispersions of this type are described in, for example, U.S. Pat. Nos. 4,339,566 and 4,722,966 and are proposed for the coating of flexible substrates, such as leather. However, embrittlement of the coating occurs, particularly in the case of application to leather, so that good abrasion resistance but poor resistance to flexing is obtained.

German Laid-Open Application DOS 3,437,918 describes radiation-crosslinkable dispersions of oligourethanes which are suitable for producing highly glossy coatings on leather which completely conceal the grain structure. This has a certain disadvantage since what the user frequently desires is precisely to retain the natural structure of the leather.

It is an object of the present invention to prepare aqueous dispersions of polyurethanes which are suitable for coatings which, when applied to flexible substrates, in particular leather, meet the high practical requirements with regard to resistance to flexing and abrasion resistance, even in the wet state. Any natural surface structure of the substrate should be retained as far as possible.

We have found that this object is achieved by dispersions of the type cited at the outset, wherein the compounds having ethylenically unsaturated groups h) are used in relatively very small amounts, i.e. in amounts corresponding to 0.02–0.08, preferably 0.04–0.07, gram equivalent of OH, and the Fikentscher K value of the polyurethane dissolved in dimethylformamide is greater than 40, preferably greater than 50, or the polyurethane is insoluble in dimethylformamide.

The present invention accordingly relates to dispersions of polyurethanes which are crosslinkable by the action of high energy radiation and contain
a) 1 gram equivalent of NCO of a polyisocyanate,
b) 0.1–0.8, preferably 0.1–0.5, gram equivalent of OH of a polyol having a molecular weight of from 400 to 6,000, preferably from 800 to 4,000, g/mol,
c) 0–0.8, preferably 0.2–0.8, gram equivalent of OH of a polyol having a molecular weight of from 62 to 399 g/mol,
d) 0–0.4 gram equivalent of NH of a polyamine having two or more amino groups which are reactive to isocyanate
e) 0–0.4 gram equivalent of OH of an amino alcohol having one or more amino groups which are reactive to isocyanate,
f) 0.05–0.5 gram equivalent of OH or NH of a compound having ionic groups or groups which can be converted into ionic groups and having one or more hydroxyl or amino groups which are reactive to isocyanate,
g) 0–0.2, preferably 0–0.1, gram equivalent of OH of a monofunctional polyetherol and
h) a compound having one or more ethylenically unsaturated groups and one or more hydroxyl groups,
with the provisos that (i) the sum of the number of gram equivalents of OH and NH is from 0.9 to 1.2, preferably from 0.95 to 1.1, and (ii) the components under a) to h) may be present in the form of individual compounds or mixtures of two or more individual compounds. In the novel dispersions, the compounds having one or more ethylenically unsaturated groups h) are used in amounts corresponding to 0.02–0.08, preferably 0.04–0.07, gram equivalent of OH and the polyurethane dissolved in dimethylformamide, has a Fikentscher K value greater than 40, preferably greater than 50, or is insoluble in dimethylformamide.

Regarding the subject of the invention, the following may be stated specifically:

The suitable polyisocyanates a) are organic compounds which have two or more free isocyanate groups. Diisocyanates $X(NCO)_2$ where X is an aliphatic hydrocarbon radical of 4 to 12 carbon atoms, a cycloaliphatic hydrocarbon radical of 6 to 15 carbon atoms, an aromatic hydrocarbon radical of 6 to 15 carbon atoms or an araliphatic hydrocarbon radical of 7 to 15 carbon atoms are preferably used. Examples of such diisocyanates are tetramethylene diisocyanate, hexamethylene diisocyanate, dodecamethylene diisocyanate, 1,4-diisocyanatocyclohexane, 1-isocyanato-3,5,5-trimethyl-5-isocyanatomethylcyclohexane, 4,4'-diisocyanatodicyclohexylmethane, 2,2-(4,4'-diisocyanatodicyclohexyl)-propane, 1,4-diisocyanatobenzene, 2,4-diisocyanatotoluene, 2,6-diisocyanatotoluene, 4,4'-diisocyanatodiphenylmethane and p-xylylene diisocyanate, as well as mixtures consisting of these compounds, in particular mixtures of aliphatic or cycloaliphatic and aromatic diisocyanates in a molar ratio of from 1:4 to 5:1. It is also possible to use, in proportionate amounts, the polyisocyanates of higher functionality which are known per se in polyurethane chemistry or modified polyisocyanates which are known per se and contain, for example, carbodiimide, allophanate, isocyanurate, urethane and/or biuret groups.

The polyols b) having a molecular weight of from 400 to 6,000 g/mol are polyesterpolyols or polyetherpolyols.

Suitable polyesterpolyols are those having molecular weights of 400 to 6,000, preferably from 800 to 4,000, in particular from 1,400 to 3,000, g/mol, and in particular such polyesterpolyols, especially -diols, of dicarboxylic acids; polyesterols based on lactones are also suitable. The polyesterpolyols, especially the -diols, are the conventional reaction products of polyhydric, preferably dihydric, and, if desired, also trihydric alcohols with polybasic, preferably dibasic, carboxylic acids. Instead of the free polycarboxylic acids, it is also possible to use the corresponding polycarboxylic anhydrides or corresponding polycarboxylic esters of lower alcohols or mixtures thereof for the preparation of the polyesters. The polycarboxylic acids may be aliphatic, cycloaliphatic, aromatic or heterocyclic and may be, for example, substituted by halogen atoms and/or unsaturated. Examples of these are succinic acid, adipic acid, suberic acid, azelaic acid, sebacic acid, phthalic acid, isophthalic acid, trimellitic acid, phthalic anhydride, tetrahydrophthalic anhydride, hexahydrophthalic anhydride, tetrachlorophthalic anhydride, endomethylenetetrahydrophthalic anhydride, glutaric anhydride, maleic acid, maleic anhydride, fumaric acid and dimeric fatty acids Examples of suitable polyhydric alcohols are ethylene glycol, 1,2- and 1,3-propylene glycol, butane-1,4-diol, butane-1,3-diol, butane-2,3-diol, butene-1,4-diol, butyne-1,4-diol, pentane-1,5-diol, hexane-1,6-diol, octane-1,8-diol, neopentylglycol, cyclohexanedimethanol (1,4-bishydroxymethylcyclohexane), 2-methyl-propane-1,3-diol, pentane-1,5-diol, glycerol, trimethylolpropane, hexane-1,2,6-triol, butane-1,2,4-triol and trimethylolethane, as well as diethylene glycol, triethylene glycol, tetraethylene glycol, polyethylene glycol, dipropylene glycol, polypropylene glycol, dibutylene glycol and polybutylene glycols.

The suitable polyesterols based on lactones are homopolymers or copolymers of lactones, preferably difunctional adducts, containing terminal hydroxyl groups, of lactones or lactone mixtures, for example ε-caprolactone, β-propiolactone, υ-butyrolactone and/or methyl-ε-caprolactone, with suitable difunctional initiator molecules, for example the low molecular weight, dihydric alcohols mentioned above as components for the polyesterpolyols. The corresponding polymers of ε-caprolactone are particularly preferred. Lower polyesterdiols or polyetherdiols can also be used as initiators for the preparation of the lactone polymers. Instead of the polymers of lactones, it is also possible to use the corresponding, chemically equivalent polycondensates of the hydroxycarboxylic acids corresponding to the lactones.

The polyetherpolyols, in particular -diols, which can be used, if necessary as a mixture with polyesterpolyols, are the products known per se in polyurethane chemistry and obtainable by, for example, polymerization of ethylene oxide, propylene oxide, butylene oxide, tetrahydrofuran, styrene oxide or epichlorohydrin with themselves, for example in the presence of $BF_3$, or by an addition reaction of these compounds, if necessary as a mixture or in succession, with initiator components having reactive hydrogen atoms, such as alcohols or amines, e.g. water, ethylene glycol, 1,3-propylene glycol, 1,2-propylene glycol, 4,4'-dihydroxydiphenylpropane or aniline.

Other suitable substances of this type are polyether-1,3-diols, for example trimethylolpropane formally alkoxylated at one group, $C_2H_5-C(CH_2OH)_2-CH_2OXR$, where X is a polyalkylene oxide chain of the type stated above or monohydric polyether alcohols, which chain is terminated by an alkyl radical R, for example $CH_3$.

Examples of suitable polyols c) having a molecular weight of from 62 to 399 g/mol are the corresponding diols and triols mentioned under b) and suitable for preparation of the polyesterols, such as alcohols having a functionality greater than 3, such as pentaerythritol or sorbitol. Polyols c) having a functionality greater than 2 are used in an amount such that the chain-terminating action of any monofunctional compounds likewise used is compensated. However, too large an amount of polyols c) having a functionality greater than 2 must not be used since otherwise the prepolymer may be cross-linked and cannot be dispersed.

The components d) which may be used are difunctional or polyfunctional amine chain extenders or cross-linking agents having a molecular weight of from 32 to 500, preferably from 60 to 300, g/mol, without tertiary amino groups. Examples of these are diamines, such as ethylenediamine, hexamethylenediamine, piperazine, 2,5-dimethylpiperazine, 1-amino-3-aminomethyl-3,5,5-trimethylcyclohexane (isophoronediamine, IPDA), 4,4'-diaminodicyclohexylmethane, 1,4-diaminocyclohexane, 1,2-diaminopropane, hydrazine, hydrazine hydrate or triamines, such as diethylenetriamine. They can be used in amounts of from 0 to 2.0 mol/mol of component b), in particular for the chain extension of the isocyanate-containing prepolymers before or, particularly in the case of triamines, after dispersion in water. The amino-containing chain extenders may also be used in blocked form, for example in the form of the corresponding ketimines (cf. for example Canadian Patent 1,129,128), ketazines (cf. for example U.S. Pat. Nos. 4,269,748 and 4,269,748) or amine salts (cf. U.S. Pat. No. 4,292,226). Oxazolidines, as used, for example, in U.S. Pat. Nos. 4,192,937 and 4,192,937, are also blocked diamines which can be used for chain extension of the isocyanate prepolymers in the preparation of the novel polyurethane dispersions. When such blocked diamines are used, they are generally mixed with the isocyanate prepolymers in the absence of water, and this mixture is then mixed with some or all of the water used for dispersing, so that the corresponding diamines are liberated as intermediates by hydrolysis.

The components e) which may be used are amino alcohols, such as ethanolamine, isopropanolamine, methylethanolamine or aminoethoxyethanol.

Components f) used are compounds which contain one or more, preferably two, groups which are reactive to isocyanate groups, and also contain ionic groups or potentially ionic groups which can be converted into ionic groups by a simple neutralization or quaternization reaction. The cationic and anionic groups are introduced by the concomitant use of compounds containing (potential) cationic groups and having hydrogen atoms which are reactive to isocyanate groups or compounds containing (potential) anionic groups having hydrogen atoms which are reactive to isocyanate groups. This group of compounds includes, for example, polyethers containing tertiary nitrogen atoms and having, preferably, two terminal hydroxyl groups, as obtainable, for example, by alkoxylation of amines having two hydrogen atoms bonded to amine nitrogen, for example N-methylamine, aniline or N,N'-dimethylhydrazine, in a conventional manner. Such polyethers generally have a molecular weight of 500 to 6,000 g/mol. Preferably, however, the ionic groups are introduced by the concomitant use of comparatively low molecular weight compounds having (potential) ionic groups and groups which are reactive to isocyanate groups. Examples of these are stated in U.S. Pat. Nos. 3,479,310 and 4,056,564 and British Patent 1,455,554. Dihydroxyphosphonates, such as the sodium salt of the ethyl ester of 2,3-dihydroxypropanephosphonic acid or the corresponding sodium salt of the unesterified phosphonic acid, may also be present as an ionic component.

Particularly preferred (potential) ionic components d) are N-alkyldialkanolamines, e.g. N-methyldiethanolamine, or N-ethyldiethanolamine, diaminosulfonates, such as the Na salt of N-(2-aminoethyl)-2-aminoethanesulfonic acid, dihydroxysulfonates, dihydroxycarboxylic acids, such as dimethylolpropionic acid, diaminocarboxylic acids or -carboxylates, such as lysine or the Na salt of N-(2-aminoethyl)-2-aminoethanecarboxylic acid, and diamines having one or more additional tertiary amine nitrogen atoms, e.g. N-methylbis-(3-aminopropyl)amine.

Any potential ionic groups initially incorporated in the polyaddition product are at least partly converted into ionic groups in a conventional manner by neutralization or by quaternization of tertiary aminic nitrogens.

Potential anionic groups, for example carboxyl groups, are neutralized using inorganic and/or organic bases, such as sodium hydroxide, potassium hydroxide, potassium carbonate, sodium bicarbonate, ammonia or primary, secondary and in particular tertiary amines, e.g. triethylamine or dimethylaminopropanol.

For the conversion of the potential cationic groups, for example the tertiary amino groups, into the corresponding cations, for example ammonium groups, suitable neutralizing agents are inorganic or organic acids, e.g. hydrochloric acid, acetic acid, fumaric acid, maleic acid, lactic acid, tartaric acid, oxalic acid or phosphoric acid, or suitable quaternizing agents are, for example, methyl chloride, methyl iodide, dimethyl sulfate, benzyl chloride, ethyl chloroacetate or bromoacetamide. Other suitable neutralizing and quaternizing agents are described in, for example, U.S. Pat. No. 3,479,310, column 6.

This neutralization or quaternization of the potential ionic groups can be carried out before or during the isocyanate polyaddition reaction, but is preferably carried out after the said reaction.

The amounts of component f), taking into account the degree of neutralization or quaternization in the case of components containing potential ionic groups, must be so chosen that the polyurethanes contain from 0.05 to 2, preferably from 0.07 to 1.0, particularly preferably from 0.1 to 0.7, meq of ionic groups per g of polyurethane The components g) which may be present are monohydric polyetheralcohols having a molecular weight of from 500 to 10,000, preferably from 1,000 to 5,000, g/mol. Monohydric polyetheralcohols are obtainable by alkoxylation of monohydric initiator molecules, for example methanol, ethanol or n-butanol, the alkoxylating agent used being ethylene oxide or mixtures of ethylene oxide with other alkylene oxides, in particular propylene oxide. Where alkylene oxide mixtures are used, however, they preferably contain not less than 40, particularly preferably not less than 65, mol % of ethylene oxide.

By means of component g), ethylene oxide segments which are present in terminal and/or side polyether chains and, together with the ionic groups, influence the hydrophilic character can, if required, thus be incorporated in the polyurethanes.

Where they are used, the compounds of the stated type having ethylene oxide units present within terminal and/or side polyether chains are employed in amounts such that, in the polyurethane dispersions, from 0 to 10, preferably from 0 to 5, % by weight of said ethylene oxide units are present in the polyurethanes. The total amount of the hydrophilic structural units (ionic groups and ethylene oxide units of the last-mentioned type) must, however, always be so chosen that the dispersibility of the polyurethanes in water is ensured.

Further examples of compounds which may be used as components a) to e) in the preparation of the novel dispersions are described in, for example, High Polymers, Vol. XVI, Polyurethanes, Chemistry and Technology, by Saunders-Frisch, Interscience Publishers, New York, London, Volume I, 1962, pages 32–42 and 44–54, and Volume II, 1964, pages 5–6 and 198–199.

Examples of suitable compounds having ethylenically unsaturated groups h) are esters of acrylic or methacrylic acid with polyols, one or more OH groups of the polyol remaining unesterified. Hydroxyalkyl (meth)acrylates $HO(CH_2)_nOOC(R^1)C=CH_2$ (where n is from 2 to 6 and $R^1$ is H or $CH_3$) and their position isomers, mono(meth)acrylates of polyetherdiols $HO(CHR^2CHR^3O)_mOOC(R^1)C=CH_2$ (where $R^1$ is H or $CH_3$, $R^2$ and $R^3$ are each H, $CH_3$ or $C_2H_5$ and m is from 2 to 20), trimethylolpropane mono- and di(meth)acrylate, pentaerythritol di- and tri(meth)acrylate or the reaction products of epoxy compounds with (meth)acrylic acid, which compounds are mentioned in U.S. Pat. No. 4,357,221, are particularly suitable. Compounds such as 4-ethenylphenol, 4-isopropenylphenol and 4-ethenylbenzyl alcohol and their position isomers or the alkoxylation products derived therefrom can also be used.

The isocyanate groups and the hydroxyl and amino groups which are reactive with isocyanate should be used in about equivalent molar ratios. The ratio of the number of isocyanate groups to the total number of hydrogen atoms which are reactive to isocyanate should be from 0.9 to 1.2, preferably from 0.95 to 1.1, in particular from 0.98 to 1.03.

To accelerate the reaction of the diisocyanates, the conventional and known catalysts, such as dibutyltin dilaurate, tin(II) octoate or 1,4-diazobicyclo[2,2,2]-octane, may be concomitantly used.

To avoid undesirable, premature polymerization of the unsaturated groups, polymerization inhibitors are added, advantageously during the preparation of the polyurethane. It is possible to use, for example, quinones, phenols or phenol derivatives, such as p-benzoquinone, hydroquinone, p-methoxyphenol and other compounds, as described in, for example, Encyclopedia of Polymer Science and Technology, Volume 7, 1967, pages 644–664, editors: Mark, Gaylord and Bikales, Interscience Publishers, Wiley & Sons, New York, London, Sydney.

The novel aqueous polyurethane dispersions are prepared by conventional methods. For example, a prepolymer having terminal isocyanate groups can first be prepared from the components a), b), h) and, if required, c), e) or g), in the melt or in the presence of an inert water-miscible solvent, such as acetone, tetrahydrofuran, methyl ethyl ketone or N-methylpyrrolidone. The reaction temperature is in general from 20° to 160° C., preferably from 50° to 100° C.

If a mixture of a (cyclo)aliphatic diisocyanate and an aromatic diisocyanate is used as the polyisocyanate a), the diisocyanates are reacted, either as a mixture with one another or in succession, with the hydroxyl compounds b), h) and, if required, c), e) or g).

The isocyanate prepolymers thus obtained, if necessary after (further) dilution with solvents of the above-mentioned type, preferably low-boiling solvents having boiling points below 100° C., are subjected to a chain-extending reaction at from 20° to 80° C. with amino-functional products of component f) and, if required, d) and are converted into the high molecular weight polyurethanes. The solution of the polyurethane which carries ionic groups as a result of the incorporation of the components f) or may contain ionic groups after neutralization or quaternization is dispersed by stirring in water, after which the solvent is distilled off.

If products having hydroxyl functional groups are used as components f) carrying (potential) ionic groups, components a), b), f), h), and, if required, c), e) and g) are converted into a polyurethane or into an isocyanate prepolymer. In the former case, the polyurethane which carries ionic groups or may carry ionic groups after neutralization or quaternization, or the solution of the said polyurethane, is dispersed in water. However, the route via an isocyanate prepolymer which, as stated above, is reacted with amine chain extenders f) and/or, if required, d) to give high molecular weight polyurethane and is dispersed in water is preferred.

The conversion of potential salt groups, for example carboxyl or tertiary amino groups, into the corresponding ions is carried out by neutralization with bases or acids or by quaternization of the tertiary amino groups before mixing with the water used for the dispersing. It is also possible, for example, for the base required for neutralizing the carboxyl groups or the acid necessary for neutralizing the tertiary amino groups to be mixed with the water used for dispersing. Furthermore, potential salt groups present in the isocyanate prepolymers, for example carboxyl groups or tertiary amino groups, can be converted partly or completely into salt groups before the reaction with the amine chain extenders, by neutralization or quaternization.

It is also possible for isocyanate prepolymers carrying ionic groups or carrying potential ionic groups to be dispersed in water, in the case of the latter prepolymers after neutralization or quaternization or with the addition of a base or acid as a neutralizing agent to the water used for dispersing, and then to be reacted with the amine chain extenders or crosslinking agents d) in the disperse phase to give the ready-prepared polyurethane.

The amount of water used for dispersing is in general such that aqueous polyurethane dispersions having a solids content of from 10 to 60%, preferably from 20 to 50%, are obtained.

It is also possible to prepare the polyurethane dispersions by the melt dispersion method as described in U.S. Pat. No. 3,756,992, where, by a suitable choice of the type and ratios of the starting materials used, it is necessary only to ensure that the resulting polyurethanes fulfill the conditions according to the invention.

When monofunctional starting materials are used, it is important to add trifunctional or polyfunctional compounds a), b), c), d) or e) in amounts such that the chain-terminating action of the monofunctional starting materials is compensated. However, the amount of polyfunctional compounds a), b), c) or e) cannot be chosen so high that the prepolymer undergoes crosslinking and is no longer dispersible. In general, not more than x/q mol of compounds a), b), c) or e) having a functionality of greater than 2 are added per x mol of monofunctional starting material, where q is the (mean) functionality of these compounds.

If, on the other hand, as described above, an isocyanate prepolymer is reacted in the disperse phase with the polyamines f), more than x/q mol of polyamines having a functionality of greater than 2 can be used, since in this case crosslinking of the polyurethane not only presents no problems but is frequently even desirable.

The K value of the polyurethane dissolved in dimethylformamide, determined according to Fikentscher, Cellulosechemie 13 (1932), 58, should be greater than 40, particularly preferably greater than 50. Polyurethanes which are insoluble in dimethylformamide are also particularly preferred.

The polymerization (crosslinking) of the polyurethanes can be carried out using high energy radiation, such as UV light or electron beams.

If the novel polyurethanes are cured by UV light, photoinitiators must be added. These may be dissolved in the polyurethane and dispersed together with the latter in the aqueous phase or stirred subsequently into the dispersion, if necessary as a solution in a water-miscible solvent.

Suitable photoinitiators are the conventionally used compounds, for example benzophenone and very generally aromatic keto compounds which are derived from benzophone, such as alkylbenzophenones, halomethylated benzophenones, according to U.S. Pat. No. 3,686,084, Michler's ketone, anthrone, and halogenated benzophenones. Benzoin and its derivatives, for example according to U.S. Pat. Nos. 3,720,635, 3,657,088, 3,607,693, 3,636,026, 3,664,937, 3,824,284, 3,891,524, 3,914,166, 3,915,823, 3,732,273 and 3,639,321, are also suitable. Other effective photoinitiators are anthraquinone and many of its derivatives, for example β-methylanthraquinone, tert-butylanthraquinone and anthraquinonecarboxylic esters, as well as oxime esters according to U.S. Pat. No. 3,558,309.

The stated photoinitiators, which, depending on the intended use of the novel materials, are used in amounts of from 0.1 to 20, preferably from 0.1 to 5, % by weight, based on the polymerizable components, can be used as individual substances or, because of the frequently advantageous synergistic effects, also in combination with one another.

Advantageous additives which may further increase the reactivity are certain tertiary amines, e.g. triethylamine and triethanolamine. They too can be used in amounts of not more than 5% by weight, based on the polymerizable components.

The novel dispersions can be applied to substrates such as metal, plastic, glass, wood, paper, cardboard, leather or textiles, for example by spraying, pouring or knife coating.

After physical drying, the coating is crosslinked by exposure using one of the conventional UV or electron beam apparatuses.

The novel dispersions applied to leather by the methods conventionally used in the leather industry possess, after radiation crosslinking, excellent resistance to flexing and to rubbing, also in the wet state, as well as a good leather-like feel, the natural structure of the leather being retained.

Particularly good properties are obtained if the leather is first bottomed with a novel dispersion, drying is carried out and a second coat of a novel dispersion, which may differ from the first, is then applied before crosslinking is effected.

Finally, it should be stated that the novel dispersions can also be crosslinked by heat. The addition of initiators which form free radicals at elevated temperatures is necessary here. For example, dibenzoyl peroxide, cumene hydroperoxide or azobisisobutyronitrile may be used. Other examples of suitable initiators are described in Polymer Handbook, 2nd Edition, Wiley & Sons, New York.

In the Examples which follow, parts and percentages are by weight, unless stated otherwise

EXAMPLE 1

394 parts of a polyester of adipic acid, neopentylglycol and hexanediol (OH number=56), 21.6 parts of butanediol monoacrylate, 10.1 parts of trimethylolpropane, 90.1 parts of butane-1,4-diol and 0.1 part of p-methoxyphenol are dried at 70° C. under reduced pressure and then reacted with 364 parts of an equimolar mixture of 1-isocyanato-3,3,5-trimethyl-5-isocyanatomethylcyclohexane (IPDI) and 4,4'-diisocyanatocyclohexylmethane (HMDI) at 70° C. until the NCO content is 0.90%. After dilution with 1,000 parts of acetone, 48 parts of a 40% strength solution of the Na salt of N-(aminoethyl)-2-aminoethanecarboxylic acid are added and dispersing is carried out using 1,370 parts of water.

Distillation of the acetone gives a finely divided dispersion having a solids content of 40%; the Fikentscher K value in dimethylformamide is 68.

A bottom dyeing consisting of 592 parts of water, 100 parts of Lepton ® black, 100 parts of Corial ® grund IF, 108 parts of Corial ® grund OK and 100 parts of Astacin ® finish PUM is applied to the side leather. After drying at 80° C., plating is carried out at 80° C. under 50 bar.

A seasoning of 300 parts of water, 150 parts of the novel dispersion described above and 7.2 parts of an initiator mixture consisting of 6 parts of benzil dimethyl ketal, 12 parts of benzophenone, 18 parts of methyldiethanolamine and 36 parts of acetone is sprayed on (15 g/DIN A4) and drying is carried out at 80° C. The leather is passed twice under a high pressure mercury lamp (120 W/cm) at 10 m/min.

Flexing strength according to IOP 20:
Dry leather: No damage after 50,000 operations
Wet leather: No damage after 20,000 operations
Wet rub fastness according to IOF 450: No damage after 300 operations.

COMPARATIVE EXPERIMENT 1

A dispersion is prepared from 394 parts of polyester from Example 1, 57.6 parts of butanediol monoacrylate, 29.4 parts of trimethylolpropane, 72 parts of butane-1,4-diol, 0.1 part of p-methoxyphenol, 184.5 parts of IPDI, 219 parts of HMDI, 1,000 parts of acetone, 56.9 parts of a 40% strength solution of the Na salt of N-(2-aminoethyl)-2-aminoethanecarboxylic acid and 1,300 parts of water by the method described in Example 1.

Distillation of the acetone gives a finely divided dispersion having a solids content of 40%; the Fikentscher K value in dimethylformamide is 47.

A seasoning of 300 parts of water, 150 parts of the dispersion described above and 7.2 parts of the initiator mixture from Example 1 is sprayed (15 g/DIN A4) onto side leather which has been bottomed as in Example 1, and drying is carried out at 80° C. The leather is passed twice under a high pressure mercury lamp (120 W/cm) at 10 m/min.

Flexing strength according to IOP 20:
Dry leather: Severe damage after 50,000 operations
Wet leather: Severe damage after 20,000 operations
Wet rub fastness according to IOF 450: Slight damage after 300 operations.

EXAMPLE 2

591 parts of a polyester of adipic acid, neopentylglycol and hexanediol (OH number=56), 18.7 parts of butanediol monoacrylate, 8.7 parts of trimethylolpropane, 27 parts of butane-1,4-diol and 0.1 part of p-methoxyphenol are dried at 70° C. under reduced pressure and then reacted with 236 parts of an equimolar mixture of 1-isocyanato-3,3,5-trimethyl-5-isocyanatomethylcyclohexane (IPDI) and 4,4'-diisocyanatocyclohexylmethane (HMDI) at 70° C. until the NCO content is 0.96%. After dilution with 800 parts of acetone, 48 parts of a 40% strength solution of the Na salt of N-(2-aminoethyl)-2-aminoethanecarboxylic acid are added and dispersing is then carried out at 50° C. in the course of 20 minutes using 960 parts of water. Thereafter, a mixture of 5.8 parts of diethylenetriamine, 2.7 parts of 1-amino-3,3,5-trimethyl-5-aminomethylcyclohexane and 365 parts of water is added.

Distillation of the acetone gives a finely divided dispersion having a solids content of 40%; the polyurethane is insoluble in dimethylformamide.

A preliminary seasoning of 300 parts of water, 150 parts of the novel dispersion described above and 7.2 parts of the initiator mixture from Example 1 is sprayed (15 g/DIN A4) onto side leather which has been bottomed as in Example 1, and drying is carried out at 80° C.

A seasoning as in Example 1 is sprayed on and is irradiated as described there.

Flexing strength according to IOP 20:
Dry leather: No damage after 50,000 operations
Wet leather: No damage after 20,000 operations
Wet rub fastness according to IOF 450: Slight damage after 150 operations.

COMPARATIVE EXPERIMENT 2

The procedure described in Example 2 is followed, except that the seasoning contains the dispersion from Comparative Experiment 1.

Flexing strength according to IOP 20:
Dry leather: Slight damage after 50,000 operations
Wet leather: Severe damage after 20,000 operations
Wet rub fastness according to IOF 450: Slight damage after 150 operations.

We claim:

1. An aqueous dispersion of a polyurethane which is crosslinkable by the action of high energy radiation and contains
   a) 1 gram equivalent of NCO of a polyisocyanate,
   b) 0.1–0.8 gram equivalent of OH of a polyol having a molecular weight of from 400 to 6,000 g/mol,
   c) 0–0.8 gram equivalent of OH of a polyol having a molecular weight of from 62 to 399 g/mol,
   d) 0–0.4 gram equivalent of NH of a polyamine having two or more amino groups which are reactive to isocyanate,
   e) 0–0.4 gram equivalent of OH of an amino alcohol having one or more amino groups which are reactive to isocyanate, f) 0.05–0.5 gram equivalent of OH or NH of a compound having ionic groups or groups which can be converted into ionic groups and having one or more hydroxyl or amino groups which are reactive to isocyanate, g) 0–0.2 gram equivalent of OH of a monofunctional polyetherol and h) a compound having one or more ethylenically unsaturated groups and one or more hydroxyl groups, with the provisos that (i) the sum of the number of OH and NH gram equivalents is from 0.9 to 1.2 and (ii) the components under a) to h) may be present in the form of individual compounds or mixtures of two or more individual compounds, wherein the compound having an ethylenically unsaturated group h) is used in amounts corresponding to 0.02–0.08 gram equivalent of OH; and the polyurethane, dissolved in dimethylformamide, has a Fikentscher K value greater than 40 or is insoluble in dimethylformamide.

2. A process for the production of coated leather, wherein the leather is coated with an aqueous dispersion as claimed in claim 1, and the polyurethane present in the coating is then crosslinked.

3. The aqueous dispersion according to claim 1, wherein compound h) is used in an amount corresponding to 0.04–0.07 gram equivalent of OH.

* * * * *